Patented Apr. 14, 1953

2,635,122

UNITED STATES PATENT OFFICE 2,635,122

MANUFACTURE OF CHLOROPRENE

James H. Dunn, Clarence M. Neher, and Percy W. Trotter, Baton Rouge, La., assignors to Ethyl Corporation, New York, N. Y., a corporation of Delaware No Drawing. Application November 8, 1950, Serial No. 194,724

3 Claims. (Cl. 260—655)

This invention relates to the manufacture of chloroprene. More particularly, the invention relates to a process whereby chloroprene is produced by a new reaction which utilizes a new and more economical starting material than hitherto used.

It is well known that chloroprene (2-chloro-1,3-butadiene) is a valuable and useful intermediate material for the production of a polymeric material resembling natural rubber, but superior to natural rubber in some respects. In particular, chloroprene polymer can be used in the fabrication of articles for service conditions which are too severe for natural rubber. For example, chloroprene withstands the action of petroleum solvents and fuels much more successfully than does natural rubber.

A principal method of preparing chloroprene has been by the catalyzed hydrochlorination of monovinyl acetylene, a process which also results in the concurrent formation of appreciable quantities of the other and less desirable chlorobutadiene isomers, and of dichlorobutenes. The latter are formed by the further addition of hydrogen chloride to the chlorobutadienes. Another method of manufacturing chloroprene is by the partial addition chlorination of butadiene to 1,2-dichlorobutene-3, and then subjecting to dehydrochlorination by the action of a basic reagent.

The above and other methods of producing chloroprene all require a four carbon atom molecule in the course of preparation. For example, the most common process involves the separate manufacture of monovinyl acetylene, which in turn required the preparation of a pure stream of acetylene by the calcium carbide process. The feed materials for the prior processes are thus relatively expensive, or, as in the case of butadiene, much in demand for other purposes, particularly in times of national emergency.

The object of our invention is to provide a new reaction for the manufacture of chloroprene. Another object is to provide a process which does not depend upon or require a supply of monovinyl acetylene, butadiene or other four carbon atom material as a feed stream. A further specific object is to provide a process whereby chloroprene can be manufactured in good yields directly from vinyl chloride.

In its broadest terms, our process comprises the heating of vinyl chloride to mild pyrolytic conditions, such that a substantial proportion of the vinyl chloride pyrolized is converted to and is recoverable as chloroprene. It has been discovered that chloroprene, although more susceptible to thermal decomposition than vinyl chloride itself, is nevertheless formed at the temperatures required for pyrolysis of the vinyl chloride feed material and is obtained in good yield.

The pyrolytic treatment is preferably carried out in the absence of any catalyst or catalytic metal surfaces. The temperature of treatment is in the range of 450° C. to 650° C., the preferred range of operating temperature being about 550° C. to 650° C. The desired reaction is accomplished by utilizing a short contact time at the above temperature, the flow of the vinyl chloride feed being adjusted to provide a contact time in the range of about 2 to 10 seconds. Immediately on discharge from the pyrolysis zone, the reacted stream is cooled to a temperature at which the chloroprene content is relatively stable, the chloroprene product being then recovered from the reacted mixture.

The details of operation of our process will be more fully understood from the following examples.

Example I

A supply of vinyl chloride was vaporized and fed at slightly above atmospheric pressure to a reaction chamber consisting of a stainless steel tube. The tube was fabricated of the 18 percent chromium-8 percent nickel type alloy designated as type 304 by the American Iron and Steel Institute. The reactor tube was one-fourth inch inside diameter and 12 feet long. The vinyl chloride vapor was fed at a rate providing a contact time of 3.3 seconds, the tube being maintained at a temperature of 500° C. by a surrounding molten salt bath consisting of a commercially available eutectic mixture of sodium nitrate and potassium nitrate.

The product gases leaving the reactor tube were passed through a water cooled heat exchanger to immediately reduce the temperature below 100° C. and stop further reaction. The cooled gases then were passed to a cooling and purifying system. This system included a cooler for cooling the gases to approximately 0° C., a water scrubber for absorption of any hydrogen chloride formed, followed by a dryer for removal of water vapor, and a final cooler operating at about −80° C. to cause condensation of all liquefiable components. Non-condensable components such as acetylene or hydrogen were then vented to the atmosphere.

Excess or unreacted vinyl chloride was removed from the liquefied product by a fractional distillation. The bottoms cut of the distillation was identified as chloroprene or 2-chloro-1,3-butadiene. The boiling range of the fraction at atmospheric pressure was 58–65° C. The density was 0.95 gram per cubic centimeter. The recognized corresponding properties of chloroprene are as follows: 59° C. boiling point, and 0.958 gram per cubic centimeter density.

Measurement of the amount of the chloroprene isolated and the quantity of hydrogen chloride absorbed showed that 78 percent of the vinyl chloride which was reacted was recovered as chloroprene. The degree of pyrolysis was kept at the low level of about 0.8 percent of the vinyl chloride fed, in order to insure the high yield obtained. Higher degrees of conversion or pyrolysis can, however, be obtained by the use of slightly higher reaction temperatures, as illustrated by the following example.

Example II

Vinyl chloride was vaporized and subjected to thermal treatment by the same procedure as in Example I, except that the rate of feed was adjusted to provide a contact time of 4.2 seconds. In addition, the average temperature of the reaction zone was raised to about 575° C. The amount of conversion was raised to 3.4 percent of the vinyl chloride fed. The yield of chloroprene was 66 percent of vinyl chloride reacted.

The product of our pyrolytic treatment has been further identified as chloroprene by means of forming an addition product with maleic anhydride, according to the method of Carothers (Journal American Chemical Society, volume 53, pages 4203–25 (1931)). Following that procedure, a portion of the material was reacted with an equal amount of fused maleic anhydride at a temperature above 50° C. The product of the reaction was crystallized from water solution and the melting point range determined to be 171–171.4° C. The melting point of the corresponding derivative, made from a known chloroprene sample, is 171–172° C.

As will be seen from the foregoing examples, our process affords a convenient and straightforward method of producing chloroprene in good yields from vinyl chloride. As is well known, vinyl chloride is easily manufactured by the addition of hydrogen chloride to acetylene, by the substitution chlorination of ethylene, or by the dehydrochlorination of ethylene chloride. Our process, therefore, allows rapid and efficient conversion of ethane, ethylene, or acetylene, to chloroprene, by first converting to vinyl chloride by known methods and then manufacturing chloroprene according to the present process. The process is particularly advantageous in combination with an ethane chlorination plant. The chlorination of ethane is accompanied by the formation of appreciable amounts of 1,1-dichloroethane as well as other polychloroethanes. Although there is no particular demand for 1,1-dichloroethane, it is easily converted to vinyl chloride by dehydrochlorination, the vinyl chloride being then used according to the present process, for the manufacture of chloroprene.

In carrying out our process, it has been found particularly desirable to carry out the thermal treatment of the vinyl chloride in non-catalytic reactors, or at least, in reactor tubes of materials of very low catalytic activity. It has been found that nickel or high nickel alloys should be avoided. In attempting to carry out the process in a pure nickel coil, plugging occurred very rapidly at temperatures of 500° C. or above owing to the deposition of carbon in the tube. At temperatures at which no plugging occurred, there was no detectable conversion of the vinyl chloride feed.

The preferred materials of construction for the reactor tubes are the stainless or heat resisting steels of relatively low nickel content. Examples of such steels are those designated by the following type numbers by the American Iron and Steel Institute: 301, 302, 302B, 303, 304, 414, and 431. (Steel Products Manual, section 24, 1949). In addition to such heat resisting steels, the reaction can advantageously be carried out in nonmetallic tubes. For example, reactor tubes of vitreous silico are virtually entirely free of any catalytic activity, but of course suffer from the disadvantage of being fragile and expensive.

The specific diameter of the reactor tubes is not of critical importance, providing they facilitate efficient heat transmission in the limited reaction time used. In general, we use reactor tubes with an internal diameter of less than two inches, and preferably of the order of one-half to one and one-half inches internal diameter.

As already described, the production of chloroprene by our process is made possible by the discovery that the pyrolysis of vinyl chloride is accompanied by the formation of chloroprene. Further, although the heat treatment of the vinyl chloride is necessarily carried out at a temperature at which the chloroprene is unstable, good recovery is nevertheless made possible by the restriction of the reaction period to a relatively brief period.

It has been found that the reaction time should be less than ten seconds, and preferably in the range of two to four seconds. At the lower reaction times, the reaction temperature is advantageously raised to obtain a reasonable conversion of the vinyl chloride feed. Thus, at contact periods of two to three seconds, temperatures of the order of 600 to 650° C. can advantageously be employed.

Confining the reaction period or contact time of our process to restricted duration also means that provision is made to terminate the reaction conditions promptly in the reactor outlet stream. Non-reactive conditions can be attained by several methods. The most convenient method involves the rapid cooling of the reactor outlet stream to a temperature of at least 100° C. below the temperature of reaction. Another efficient method of providing stable conditions involves the dilution of the reactor outlet stream with an inert gas or a fresh supply of the vinyl chloride feed stream.

The preferred method of providing stable conditions is the rapid cooling above described, as it facilitates and is required for recovery of the chloroprene by flash condensation and subsequent distillation of the liquid phase produced.

Having fully described the manner of operating our process, what we desire to claim by Letters Patent is:

1. The method of preparing 2-chloro-1,3-butadiene comprising pyrolytically treating vinyl chloride vapor at a temperature of 550° to 650° C. for a period of from two to ten seconds, then rapidly cooling the treated vapors to a temperature of at least 100° C. below the temperature of treatment and recovering the 2-chloro-1,3-butadiene therefrom.

2. The method of preparing 2-chloro-1,3-butadiene, comprising pyrolytically treating vinyl chloride vapor at a temperature of about 450° to 650° C. for a period of from two to ten seconds, then rapidly cooling the treated vapors to a temperature of at least 100° C. below the temperature of treatment, and recovering the 2-chloro-1,3-butadiene therefrom.

3. The method of preparing 2-chloro-1,3-butadiene, comprising pyrolytically treating vinyl chloride vapor at a temperature of about 500° C. for a period of from about two to four seconds, then rapidly cooling the treated vapors to a temperature below 100° C., and recovering the 2-chloro-1,3-butadiene therefrom.

JAMES H. DUNN.
CLARENCE M. NEHER.
PERCY W. TROTTER.

References Cited in the file of this patent

UNITED STATES PATENTS

| Number | Name | Date |
|---|---|---|
| 2,379,708 | Hearne | July 3, 1945 |